No. 782,523. PATENTED FEB. 14, 1905.
H. A. POPPENHUSEN.
TOOL FOR DETACHING BOILER TUBES.
APPLICATION FILED JULY 18, 1904.
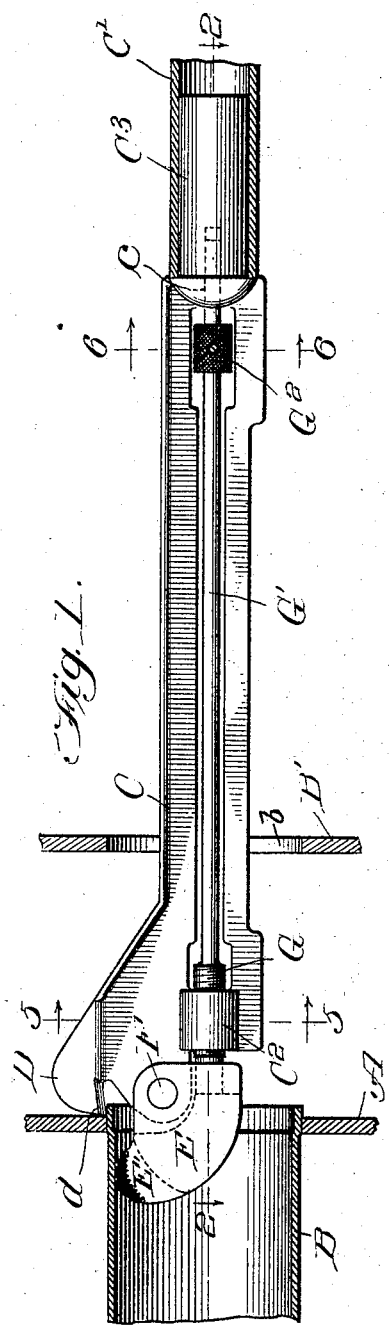
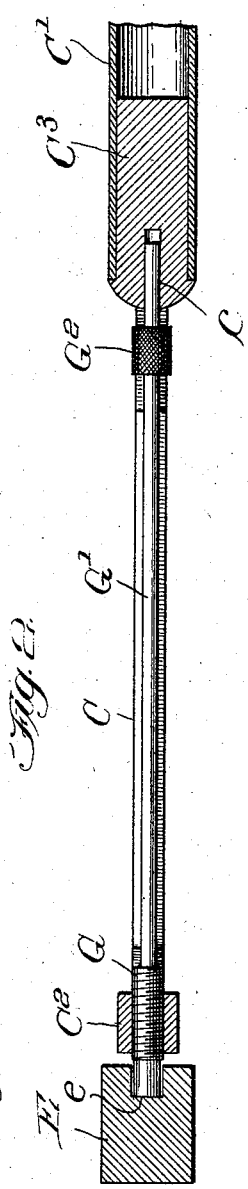
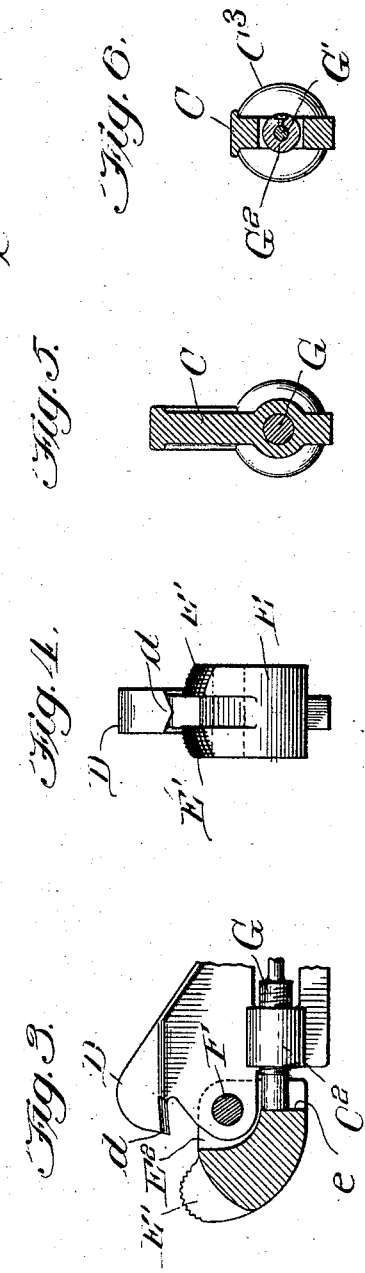
Witnesses:
H. S. Gaither
[signature]
Inventor:
Herman A. Poppenhusen.
by Poole & Brown
Attorneys No. 782,523.

Patented February 14, 1905.

UNITED STATES PATENT OFFICE.

HERMAN A. POPPENHUSEN, OF EVANSTON, ILLINOIS.

TOOL FOR DETACHING BOILER-TUBES.

SPECIFICATION forming part of Letters Patent No. 782,523, dated February 14, 1905.

Application filed July 18, 1904. Serial No. 217,328.

*To all whom it may concern:*

Be it known that I, HERMAN A. POPPENHUSEN, a citizen of the United States, and a resident of Evanston, in the county of Cook and State of Illinois, have invented certain new and useful Improvements in Tools for Detaching Boiler-Tubes; and I do hereby declare that the following is a full, clear, and exact description thereof, reference being had to the accompanying drawings, and to the letters of reference marked thereon, which form a part of this specification.

This invention relates to a novel tool or implement for use in detaching boiler-tubes from the tube sheets or heads in which they are secured.

The invention consists in the matters hereinafter described, and pointed out in the appended claims.

In the accompanying drawings, illustrating my invention, Figure 1 is a sectional view taken on a vertical plane through one end of the tube and adjacent walls of the water-head of a tubular boiler, showing in side view a preferred form of implement embodying my invention. Fig. 2 is a plan section taken longitudinally through the implement on line 2 2 of Fig. 1. Fig. 3 is a detail sectional view showing the operative parts at the working end of the implement. Fig. 4 is an end view of the operative part of the implement. Fig. 5 is a cross-sectional view taken upon line 5 5 of Fig. 1. Fig. 6 is a cross-sectional view taken upon line 6 6 of Fig. 1.

As shown in Fig. 1 of the drawings, A indicates the tube-sheet, and B the end of a water-tube which fits at one end in a hole in the tube-sheet A, which latter forms the interior wall of the water-head of a water-tube boiler, and B' a plate forming the outer wall of the water-head and which is provided with an orifice $b$, arranged in alinement with the water-tube A, as common in water-tube boilers.

Now referring to the implement constituting my invention, C indicates the main part or shank of the same, and C' a pipe or tube attached to the shank and which forms with the shank a long rigid handle or lever. The shank C is provided at its working end or extremity with a rigidly-attached laterally-extending gripping-hook D, provided at its free end with a gripping tooth or projection $d$, which has an angular sharpened or biting end directed inwardly or toward the central axis of the implement. Pivoted to the shank C is a dog E, which is generally of sector shape and provided at its end or extremity with two laterally-extending convexly-curved bearing parts or extensions E' E', which are adapted for contact with the inner surface of the tube B, into which said dog E is inserted when the tool is in use. The dog E is pivoted to the shank C by a pivot-pin F, arranged at right angles to the hook D, so that the end of the dog swings in the plane of the hook, and the dog is adjustably held in working position by an adjusting-screw G, inserted in the shank C and adapted to bear at its end on the said dog, the pivot-pin F being located between the gripping-hook and the screw, so that when the screw is advanced or retracted it will turn or swing the dog on said pivot-pin in a direction to carry the lateral bearing extensions E' E' laterally toward or from the side of the implement at which the hook is located. As herein shown, the pivot-pin F extends through the shank C at a point between the outer end of the hook and the center line of the implement and passes through two side flanges $E^2$ $E^2$ on the dog, which extend at either side of said shank. The marginal parts of the lateral projections E' E' of the dog are preferably toothed or serrated, so that they will grip the interior of the tube and prevent the tool from slipping when said extensions are in bearing against the side walls of said tube. In the particular construction of the parts illustrated in the accompanying drawings the adjusting-screw is arranged with its central axis in line with the central longitudinal axis of the shank C and tube C' and has engagement with a hub $C^2$, located at the end of the shank C nearest the dog. The said adjusting-screw G is arranged to extend beyond the end face of said hub and to act against a bearing-surface $e$ of the said dog located between the side flanges $E^2$ $E^2$ thereof, and said adjusting-screw is provided with an outwardly-extending stem or actuating-rod G', which at its outer end engages a guide or bearing aperture $c$ in the shank C, located in said shank near the outer end of the same. The adjusting-screw stem G' being located in line with the central axis of the tool, the shank C of the tool, which preferably has the form of a flat or thin bar, is provided with a central longitudinal slot or opening in which the said stem and the outer end of the said screw are located. The bearing-aperture $c$ for the outer end of said stem is located at the outer end of said slot or opening in the solid end of said shank. Near its outer end the stem G' is provided with a milled collar $G^2$, by which the stem and screw may be turned. Said body or head C of the tool is shown as provided at its outer end with a cylindric shank $C^3$, which is inserted and secured within the tube C', which constitutes the handle or lever of the implement. When the screw G is turned to move it backwardly or forwardly in the hub $C^2$, the dog will be shifted or moved on its pivot, so as to bring its laterally-extending bearing projections E' E' at a greater or less distance from the central axis of the tool, and thereby shift or move said bearing projections laterally with respect to the gripping tooth or projection $d$ of the hook D.

The gripping-hook D, which, as before stated, constitutes a lateral extension of the shank C of the implement, and its gripping or biting tooth $d$ are so arranged with respect to the lateral projections E' E' of the dog E that when said lateral projections are engaged with the inner surface of the tube B the end of the gripping-tooth will have gripping or biting engagement with the outer surface of the marginal part of the said tube, which projects beyond or outside of the plate A, as clearly seen in Fig. 1. As a result of this construction when the outer end of the lever is swung in a direction to carry the gripping-tooth inwardly with respect to the tube said lateral projections E' E' will be pressed against the inner surface of the tube, while the end of the gripping-tooth will have holding engagement with the tube at one point in its circumference, with the result that the tube will be bent inwardly by the action of the tooth at the part of the tube engaged thereby, and thus free it from the edge of the plate A, with which it is in contact. When the gripping-hook is thus engaged with the edge of the tube and the lever is moved or swung in a direction to carry said gripping-hook inwardly, the bearing projections E' E' will roll upon the inner surface of the tube, and any slipping of the instrument endwise within the tube will be prevented by the serrated or toothed edges of the extensions. In the operation of the implement in the manner described the gripping-hook at one movement of the implement will operate to bend inwardly only a small part of the circumference of the end of the tube, so that in order to completely release the end of said tube from the plate A it will be necessary to repeat the operation at a number of different points around the edge of the tube, it being, however, ordinarily necessary only to bend inwardly the end of the tube for somewhat more than one-half of its circumference in order to completely loosen or remove the end of the tube from the plate. The employment of the pivoted dog and its adjusting-screw enables the parts to be correctly adjusted for operation in any particular case, and also to enable the tube to be bent to a desired degree or extent in cases where the possible movement of the implement is limited. In operating upon the tube, the end of which is secured at the innermost of two plates A and B', constituting the water-head of a boiler, it is necessary to introduce the implement through an opening provided in the outer plate B' of the water-head, and by reason of the relatively small size of said opening the implement can be moved or swung a short distance only before it will come in contact with the edge of the opening toward which it is being moved or swung. By the lateral adjustment of the lateral extensions E' E' of the dog E relatively to the hook $d$ the margin of the tube may be drawn inwardly to a desired extent, notwithstanding the limited movement that may be given to the tool by reason of the small size of the hole in the outer plate B' of the boiler-head—that is to say, after the edge of the tube has been bent inwardly as far as possible by the swinging movement of the lever in the first operation of the implement the dog E may then be adjusted to throw the bearing projections E' E' outwardly or toward the gripping-hook, so that when a new grip is taken upon the part of the tube already depressed or drawn in by previous action of the tool a second action thereof will draw the inwardly-deflected part still farther inward, and such adjustment of the bearing projections and dog as necessary may be repeated several times until the inwardly-deflected parts of the tube end is drawn inwardly far enough for the purpose desired. In using the implement made, as described, therefore, the dog E, with its bearing-arms E', will first be adjusted by the use of the adjusting-screw G into a position in such relation or position with respect to the gripping-hook that such bearing projections may engage the inner surface of the tube at the same time the gripping-tooth engages the outer surface of the pipe or tube, while permitting the end of the lever to be inserted through the hole in the outer wall B' of the boiler-head. The lever will then be moved as far as possible or until it comes in contact with the edge of the said opening toward which it is moved. If it then be desired to depress the edge of the tube still farther, the adjusting-screw G will then be turned so as to advance its forward end, and thus shift or move the dog E on its pivot in a direction to carry the bearing-arms E' E' outward or away from the center line of the implement. A new hold may then be taken on the part of the tube first bent and the same again drawn inwardly so far as permitted by the angular movement of the lever. The extension of the stem of the screw G outwardly on the shank enables the said screw to be easily adjusted without withdrawing the implement from engagement with the tube or from the hole in the outer plate B'.

I claim as my invention—

1. An implement for the purpose set forth comprising a lever provided at one end with a laterally-extending rigid gripping-hook, a dog movably mounted on the lever and having a laterally-extending bearing projection, and means acting on the dog for laterally moving or shifting said bearing projection.

2. An implement for the purpose set forth comprising a lever provided at one end with a laterally-extending rigid gripping-hook, a dog pivoted to said lever and provided with a laterally-extending bearing projection, and adjusting means for the dog.

3. An implement for the purpose set forth comprising a lever provided with a laterally-extending rigid gripping-hook, a dog pivoted to the end of the lever adjacent to the gripping-hook and provided with a laterally-extended bearing projection and an adjusting-screw arranged longitudinally of the lever and acting on the said dog to turn the same on its pivot.

4. An implement for the purpose set forth comprising a lever provided at one end with a laterally-extending rigid gripping-hook, a dog pivoted to the end of the lever adjacent to said gripping-hook and provided with a laterally-extending bearing projection, and an adjusting-screw provided with a stem or actuating-rod which extends longitudinally of the lever toward the outer end thereof.

In testimony that I claim the foregoing as my invention I affix my signature, in presence of two witnesses, this 15th day of July, A. D. 1904.

HERMAN A. POPPENHUSEN.

Witnesses:
C. CLARENCE POOLE,
GERTRUDE BRYCE.